COUNTING-RELAY SELECTOR AND SWITCHING SYSTEM

Filed May 22, 1947 4 Sheets-Sheet 1

INVENTORS
IVAN VITALIS GRUNDIN
ERIK GUNNAR VALFRID ERLANDSSON
BY Otto Munk
THEIR ATTY

COUNTING-RELAY SELECTOR AND SWITCHING SYSTEM

Filed May 22, 1947 4 Sheets-Sheet 2

INVENTORS
IVAN VITALIS GRUNDIN
ERIK GUNNAR VALFRID ERLANDSSON
BY Otto Munk
THEIR ATT'Y

COUNTING-RELAY SELECTOR AND SWITCHING SYSTEM

Filed May 22, 1947 4 Sheets-Sheet 3

INVENTORS
IVAN VITALIS GRUNDIN
ERIK GUNNAR VALFRID ERLANDSSON
BY Otto Munk
THEIR ATTY

COUNTING-RELAY SELECTOR AND SWITCHING SYSTEM

Filed May 22, 1947 4 Sheets-Sheet 4

INVENTORS
IVAN VITALIS GRUNDIN
ERIK GUNNAR VALFRID ERLANDSSON
BY Otto Munk
THEIR ATTY Patented Feb. 20, 1951

2,542,079

UNITED STATES PATENT OFFICE 2,542,079

COUNTING-RELAY SELECTOR AND SWITCHING SYSTEM

Ivan Vitalis Gründin and Erik Gunnar Valfrid Erlandsson, Stockholm, Sweden

Application May 22, 1947, Serial No. 749,626
In Sweden December 14, 1945

16 Claims. (Cl. 179—18)

This invention relates to communication systems and particularly to selector and switching systems for measuring, telephonic, telegraphic, radio or other communication purposes.

One object of the invention is to provide a switch or selector composed of relays provided with cores having a remanent magnetic field, which relays can be operated by means of short current impulses, and which has no other movable mechanical parts than the armatures and contacts of the relays. The selector is intended to be installed at a place at considerable distance from a controlling station or exchange and at which place there are no supervision and no current supply of any kind.

Another object of the invention is to provide a switching system particularly for telephone communication comprising a small automatic or semi-automatic telephone plant arranged to connect a plurality of subscribers' lines over a few trunk lines to a supervisory manual or automatic exchange. Such a small plant is provided with a selecting equipment installed at a convenient place, for example in a sparsely populated district, in order to save the cost of long individual subscribers' lines to a distant central exchange.

Switching equipment according to the invention can thus replace small manual switchboards, and an economic automatic telephone service can now be established between distant small telephone plants and a centrally located supervising telephone plant.

A switching system according to the present invention comprises selecting equipment consisting of one or more selectors, to which subscribers' lines and trunk lines are connected at the local plant, and operating organs, for example a repeating relay set for each trunkline installed at a supervisory station or exchange for the operation of said selectors at the said local plant.

Formerly it has been necessary to provide current supply of some kind at a distant small local plant for the operation of selecting equipment. Such a current supply, however, causes relatively high costs for installation, operation and maintenance.

In order to avoid these disadvantages step-by-step driven selectors, provided with rotatable contact arms, have been used. Such selectors are, however, exposed to wear and tear and often out-of-order conditions occur. Such a selector calls for a relatively high energy for its operation. In order to reduce the resistance of the trunk line through which the necessary impulse energy has to be transmitted, ground has been used as a return circuit, so that the potential drop in the trunk line could be reduced to half value. The use of ground as return circuit is, however, a great drawback, particularly from the view points of lightning, atmospheric disturbances and such potential differences, which always exist in the ground.

The present invention eliminates all of the above mentioned inconveniences and provides reliable selecting organs, which are easily operated with a minimum of energy.

A selector according to the invention comprises a plurality of successively operable electromagnetic relays, the magnetic circuits of which are so arranged that each relay, after having been operated by means of a current in a certain direction through a winding of said relay, remains operated, due to a remanent magnetic field in its core after the said current has ceased, and means associated with the selector to direct a supplied de-magnetizing current to a winding of any of said relays for restoring the armature of any of said relays to normal position.

The remanent magnetic field in the core is obtained by making the core of soft or mild steel.

After a current has caused the armature of such a relay to operate, the armature is kept in operated position, after the magnetizing current has ceased, due to the remanent magnetic field left in the steel core. A current impulse in the opposite direction through the winding causes a magnetic field in opposite direction. The said remanent magnetic field is removed, so that the armature returns to its normal position.

At least one selector according to the invention forms part of an automatic branch exchange in a switching system, in which there are a plurality of stations, a metallic circuit communicating each station with said selector, a supervisory station, at least one metallic trunk line communicating said supervisory station with each selector, means at the supervisory station for transmitting current pulses over any of said trunk lines for operating and de-magnetizing any of said relays, in order to establish automatic communication between said stations and the supervisory station.

The invention will be better understood by referring to the accompanying drawings, which illustrate selected ways of carrying the invention into effect, although it will be understood that the invention is capable of application to a number of different switching layouts, in which use is made or can be made of the inventive features set out in the accompanying drawings and claims.

According to the present invention a telephone switching system for the purpose above indicated is composed of a telephone branch exchange without current source and comprises a selecting device for each of the trunklines to the supervisory station. These selecting devices are composed of electromagnetic relays, which can be caused to operate one after another by means of current pulses over a corresponding trunkline transmitted from the supervisory station and these relays thereafter remain operated by remanent magnetism in the cores of the respective relays, after the current pulse has ceased.

At the supervisory station there are provided for each trunkline a repeating relay set for the transmission and control of the necessary operating currents, and a selector device, which is operated synchronously with the corresponding selector at the branch exchange, and which connects the trunklines to a plurality of junction lines connected to the switching organs of the supervisory exchange.

Figure 1:
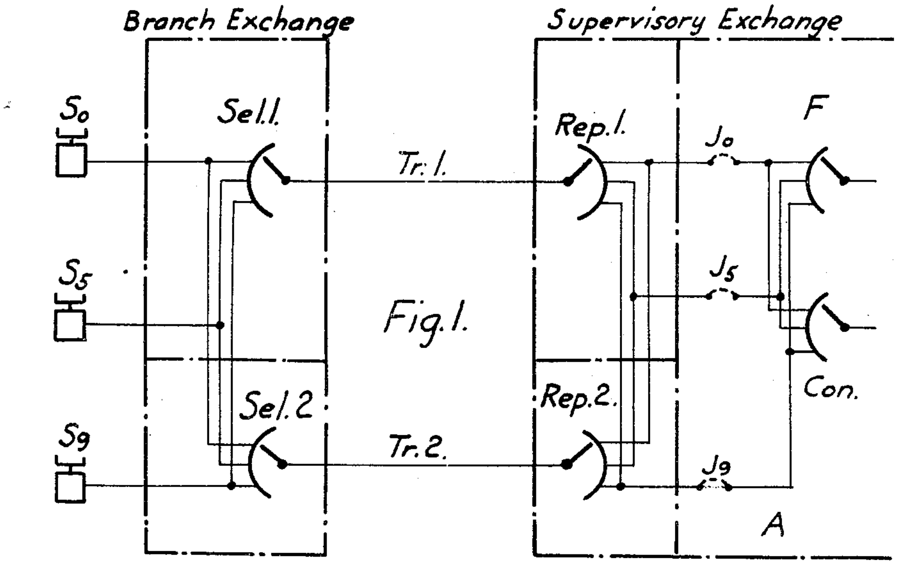
Fig. 1 is a schematic circuit diagram showing a switching system according to the invention, in which an automatic branch exchange with a plurality of subscribers is connected over trunk lines to a telephone exchange.

In Fig. 1 subscribers' apparatuses $S_0$, $S_5$ and $S_9$ are schematically connected by metallic circuits to an automatic branch exchange comprising selector devices *Sel.* 1 and *Sel.* 2. These selector devices are connected by metallic trunklines *Tr.* 1 and *Tr.* 2 with repeating relay sets 1 and 2 at a supervisory station, which repeating relay sets are connected by means of junction lines $J_0$, $J_5$ and $J_9$ of the same number as the subscribers connected to the branch exchange. The supervisory exchange can be manual, semi-automatic or automatic as shown in the drawing, where *F* is a finder switch and *Con.* is a connector in an automatic exchange.

Figure 2:
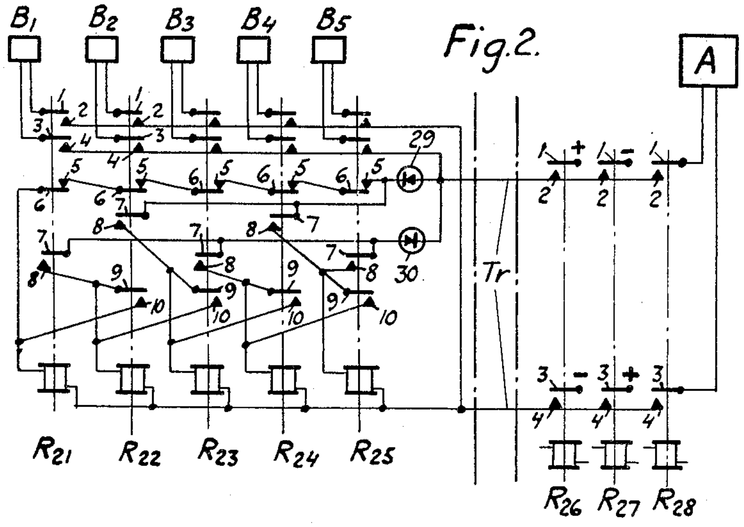
Fig. 2 is a schematic diagram of a simple selector, which by means of current pulses over a trunk line can be caused to connect any one of five stations, for example telephone stations or measuring circuits over a trunk line to a supervisory station.

According to Fig. 2 connection can be established between a supervisory device A at a remote place and any one of five stations B1—B5 connected to a branch exchange comprising a selecting device R21—R25 over a metallic circuit. The supervisory device can consist, for example, of a measuring or control device. All stations can also be telephone or telegraph apparatuses, signal devices or the like.

The operation of the selecting device at the branch exchange can be accomplished to a desired position by transmitting short current pulses of varying direction from the supervisory station by means of contact groups 1—2 and 3—4 of relays R26 and R27 respectively. When relay R26 is actuated, current from a current source is transmitted over the trunkline *Tr* for a short moment, and relay R21 is operated at the branch exchange over a rectifier 29 and contacts 5—6 of relays R22—R25.

Relay R21 remains actuated on account of its remanent magnetic field, after contact groups 1—2 and 3—4 of relay R26 have been restored to normal positions. In actuated position relay R21 keeps apparatus B connected to a trunkline *Tr* over its contacts 1—2 and 3—4. By closing contacts 1—2 and 3—4 of relay R28, station B1 can be connected to the supervisory device A.

If instead station B2 should be connected, contacts 1—2 and 3—4 of relay R27 should be closed for a short moment, whereby a current in opposite direction is transmitted over the trunkline from the current source over a rectifying device 30, and relay R22 is operated over contact 7—8R21, which was previously closed.

As soon as R22 is operated, relay R21 is deenergized by the same current pulse, which operated R22, over contact 9—10R22. Contacts 1—4R22 connect station B2 with the trunkline *Tr.*

By further current pulses of alternating direction over contact groups 1—4 of relays R26 respectively R27 stations B3, B4 and B5 can be successively connected to the trunkline. After relay R25 has been operated by a current pulse over contacts 1—4R26, whereby relay R24 is deenergized, the selecting device can be restored to normal by a further current impulse over contacts 1—4R27. Relay R25 is then de-magnetized by current over rectifying device 30 and its own contact 7—8.

Figure 3:
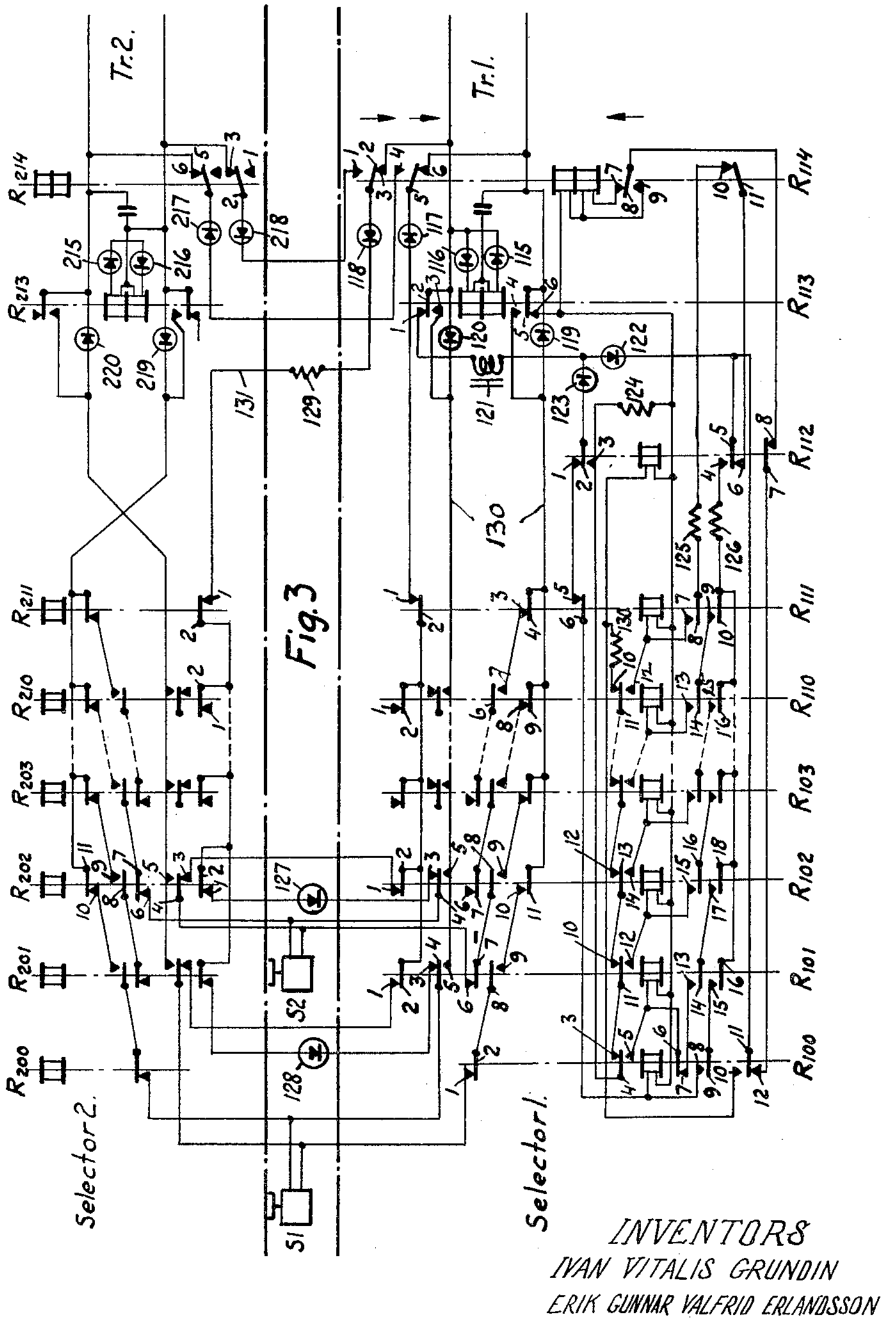
Fig. 3 is a schematic diagram of an automatic telephone branch exchange comprising two selectors, to which exchange a plurality of subscribers' lines and two trunk lines to a supervisory exchange are connected.

In Fig. 3 is shown a schematic diagram of a selector 1 associated with a trunkline *Tr.* 1 and of which relays R100—R112 are provided with remanent magnetic field cores of mild steel. A second selector 2 with trunkline *Tr.* 2 is shown in part with contacts in series with circuits common to the first selector.

Figure 4:
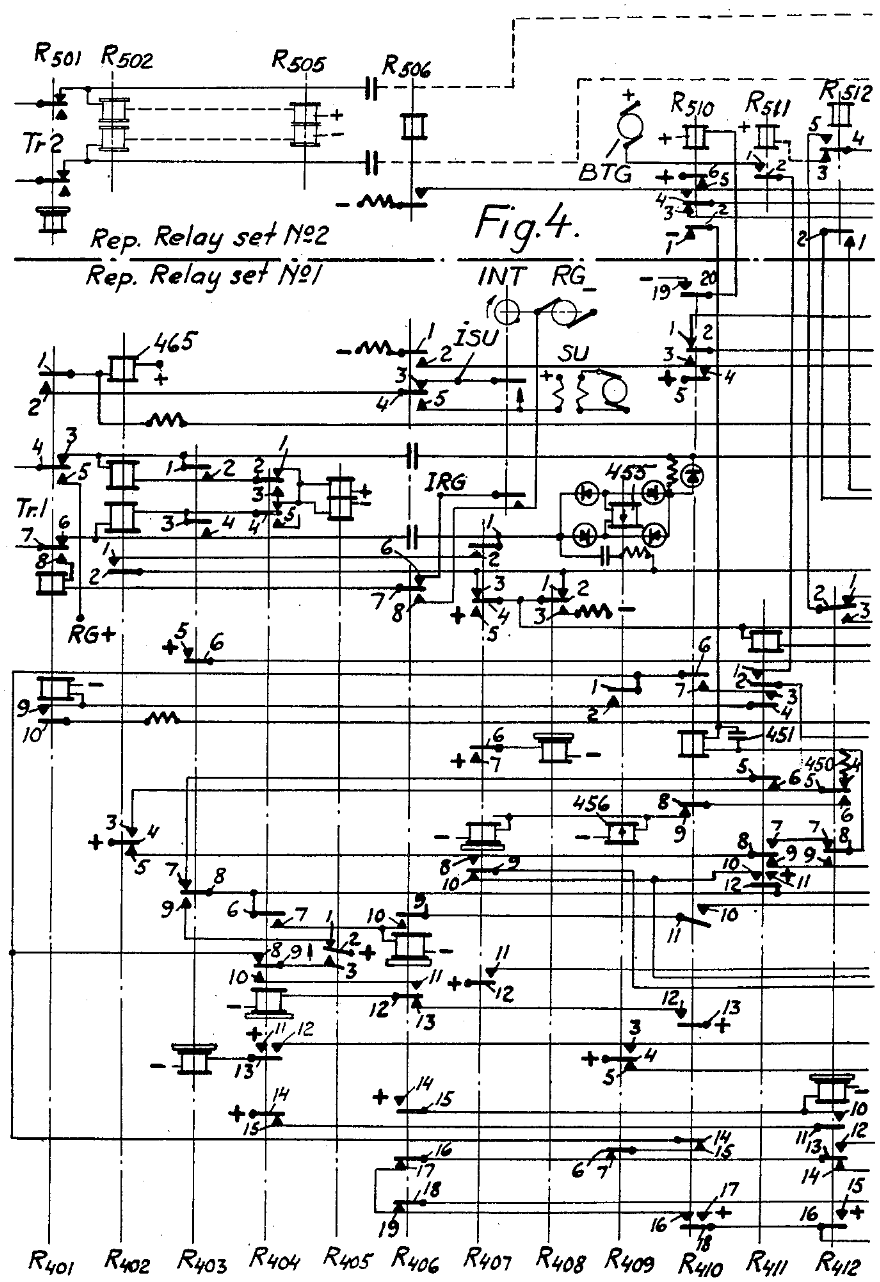
Figs. 4–5 show a diagram of repeating relay sets and selectors at the supervisory station, which relay sets and selectors are connected over trunk lines with the selectors at the branch exchange shown in Fig. 3, and also connected over junction lines of the same number as the subscribers' lines at the branch exchange to the corresponding subscribers' terminals at the supervisory exchange.
Figure 5:
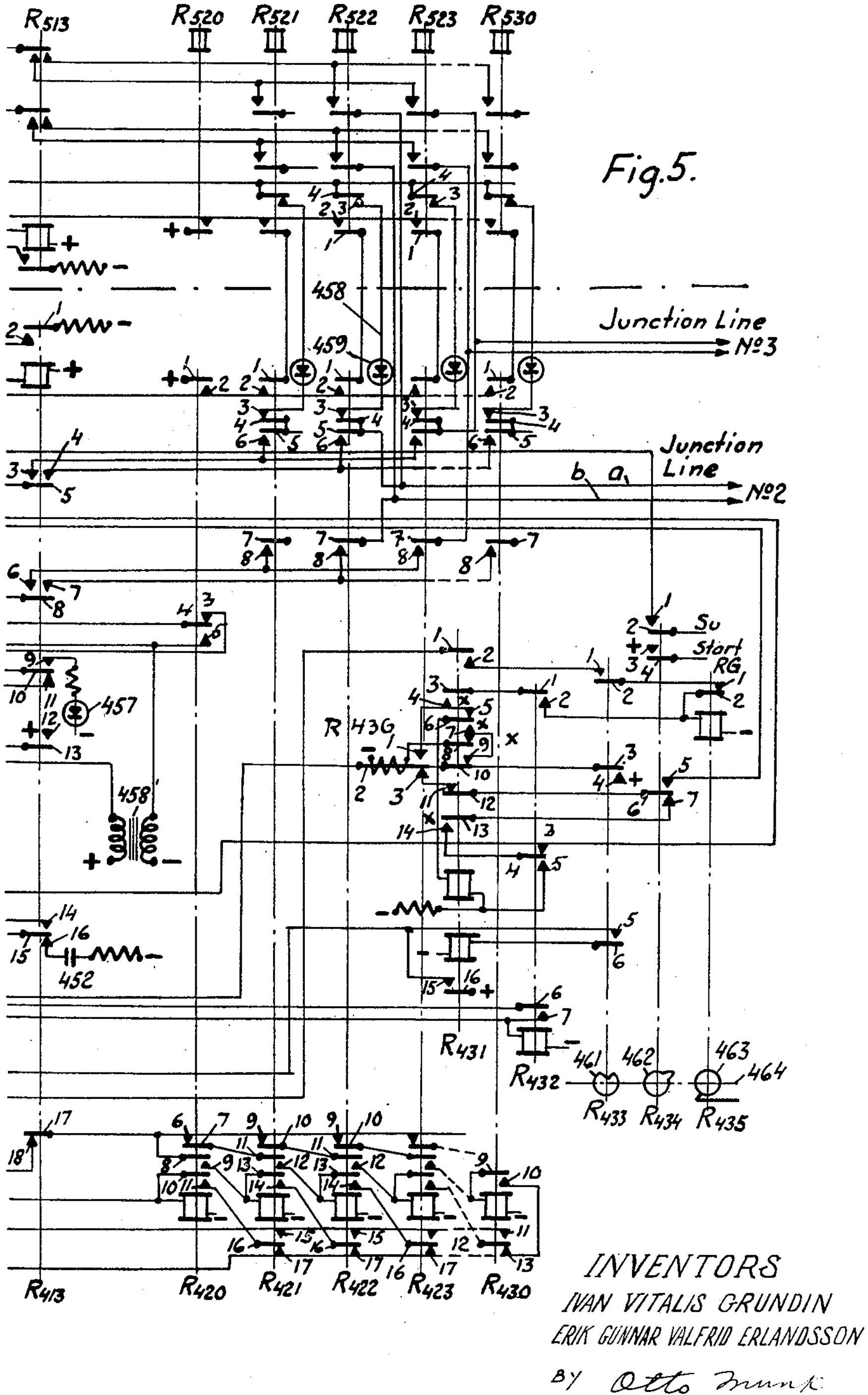

Figures 4–5 show a schematic diagram of a repeating relay set at the supervisory station. The figures show the equipment for a trunkline *Tr.* 1 and the necessary contacts in the repeating relay set No. 2 for a second trunkline *Tr.* 2, which enter in circuits common to the repeating relay set No. 1. In the same manner as in Fig. 3 these common circuits can be extended to additional trunklines.

In the following a detailed description of the function of a switching system will be given as follows:

(*a*) Outgoing calls from a subscriber at the branch exchange, Fig. 3.

(*b*) Incoming calls to a subscriber at the branch exchange.

(*c*) Interruption of a local call on account of an incoming long distance call.

(*d*) Restoration to normal of the switching devices after termination of a call.

(*e*) Supervision and time limiting devices.

(*f*) Automatic devices for marking and neutralizing out-of-order conditions.

(*g*) Special details.

(*a*) *Outgoing calls from a subscriber at the branch exchange* (*Figs. 3–5*)

Normally, when no call is made, relay R114 is operated over the trunkline *Tr.* 1 in series with windings of relays R402 and R405 over the following circuit: Plus, winding R405, contact 1—2R404, winding R402, contact 3—4R401, upper wire of trunkline Tr. 1, contact 1—2R113, choke coil 121, rectifier 122, contact 11—12R100, contact 7—8R112, contact 8—9R114, upper winding R114, contact 5—6R113, lower wire trunkline Tr. 1, contact 6—7R401, lower winding R402, contact 3—4R404, lower winding R405, minus. The resulting current over this circuit will operate relay R405 and R114, but it is too weak to operate relay R402. Relays R114 and R405 are on account of being normally operated shown with their contacts in actuated positions in the drawings.

All subscribers' lines normally pass over break contacts of corresponding selecting relays of the two selectors to a common call circuit, which is connected to trunkline Tr. 1 when not busy. Only two subscribers S1 and S2 are shown connected in Fig. 3.

The subscribers' telephones are of normal common battery type with or without dial and a condenser in series with the bell. No current can therefore pass over the calling circuit, when all telephones are on their hooks.

If a subscriber, for example No. 2, lifts his telephone from its hook, current will flow over the following calling circuit and trunkline Tr. 1: Upper wire of trunkline *Tr.* 1, contact 2—3R114, rectifier 118, resistance 129, contacts 1—2R211, contact 1—2R202, rectifier 127, contact 3—4R102, transmitter of subscriber S2, contact 3—4R202, contact 1—2R102, contact 1—2R111, rectifier 117, contact 5—6R114, lower wire of trunkline Tr. 1, contact 6—7R401, lower winding R402, lower winding R405, battery, upper winding of R405 and R402, contact 3—4R401, and back over wires of trunkline *Tr.* 1.

The current in the trunkline will now increase so that relay R402 will operate. When relay R402 operates, a plurality of relays of the repeating relay set No. 1 will operate. Thus R410 will operate, whereafter R406 and R404, which relays from a pulse transmitting device, will alternatingly operate and de-energize. Relay R410 will operate over the following circuit: Plus, contact 3—4R402, contact 4—5R412 resistance 450, winding R410, contact 1—2R510, minus. Relay R404 will operate over the following circuit: Plus, contact 12—13R410, contact 12—13R406, winding R404, minus. Relay R406 operates over the following circuit: Minus, winding R406, contact 6—7R404, contact 7—8R403, contact 5—6R411, contact 3—4R402, plus.

As soon as relay R406 operates, it breaks its contacts 12—13, thus interrupting the operating circuit of R404, which de-energizes. When R404 is de-energized, it breaks its contacts 6—7 and the operating circuit of R406 is interrupted, whereafter the operation and de-energization of these relays alternatingly will continue. Relay R404 thereby transmits current pulses over its contacts 1—5 of alternately opposite directions over the trunkline Tr. 1. These pulses will cause each one of relays R100—R111 of the branch exchange selector 1 successively to operate and to de-energize when the next relay in the chain is energized.

Synchronously with these operations of relays R100—R111 relays R420—R430 of a selector device associated with the repeating relay set No. 1 of the supervisory exchange are caused successively to operate and de-energize in similar manner as above described for R100—R111. These relays successively connect a number of junction lines (only No. 2 and 3 are shown in the drawing), equal in number to the subscribers' lines connected to the branch exchange, and terminating in the switching organs of the supervisory exchange.

The operations are interrupted, when a calling subscriber's line has been connected with the trunk line by the corresponding relay R100—R111.

The detailed switching sequence is as follows: Subscriber S2 lifts his telephone from its hook and closes the calling circuit as before has been described. Relay 402 is energized. Relay 402 closes its contacts 3—4 and causes R410 to operate as before described. Relay R410 is somewhat slow-acting, due to resistance 450 and condenser 451. Relay R410 closes its contacts 16—18 and 12—13, whereby R420 and R404 are energized, the latter one being somewhat slow-acting. R420 operates over the following circuit: Minus, winding R420, contact 13—14R412, contact 16—17R406, contact 16—18R410, plus. R404 operates over the following circuit: Minus, winding R404, contact 12—13R406, contact 12—13R410, plus.

Relay R404 changes the direction of current in the windings of relay R402 and in the trunkline Tr. 1 and closes the following circuit: Minus, relay R403, contact 11—13R404, plus. Relay R403 is energized.

When the said direction of current is changed, relay R402 and relay R114 in the branch exchange are de-energized, because current through R114 is now blocked by rectifier 122.

When R403 is operated, contacts 1—2 and 3—4R403 are closed, whereby windings of R402 are short-circuited, so that R402 cannot again operate after the direction of current in the trunkline is changed. The current over the trunkline is instead directed over rectifier 123 and relay R100 is operated over the following circuit: Lower wire of Tr. 1, contact 5—6R113, winding R100, contact 5—6R111, contact 1—2R112, rectifier 123, choke coil 121, contact 1—2R113, upper wire of Tr. 1.

When relay 402 is deenergized, its contacts 3—4 are opened, but relay R410 remains operated due to slow acting on account of a condenser 451 connected in parallel with its winding.

When relay R114 in the branch exchange is de-energized, the common calling circuit of the two selectors is switched over to the other trunkline Tr. 2, and a relay R502 in the repeating relay set No. 2 is operated. Relay R510, however, does not operate due to the fact that its circuit is open by contact 19—20R410.

Relay R403 closes the following circuit: Minus, winding R406, contact 6—7R404, contact 8—9R403, contact 1—2R405, plus. Slow-acting relay R406 is energized. Relay R406 closes the following circuit: Minus, winding relay R412, contact 14—15R406, plus. Slow-acting relay R412 is operated, whereby the previous energizing circuit of R420 is interrupted, but relay R420 is kept operated over the following circuit: Minus, winding R420, contact 10—11R420, 15—16R421, plus.

Relay R406 interrupts also the operating circuit of relay R404, which is de-energized after slow-acting. Relay R412 momentarily interrupts the operating circuit of R410 over its contact 4—5, which however receives operating current over its contact 8—9, contact 8—9R411, contact 4—5R402, plus.

When R404 is de-energized, the original direction of current in the trunkline Tr. 1 is restored. Holding current for relay R100 in the branch exchange is then interrupted, but R100 remains operated due to magnetic remanence of its core, and directs current from rectifier 122 to relay R112, so that relay R112 operates over the following circuit: Upper wire Tr. 1, contact 1—2R113, choke coil 121, rectifier 122, contact 10—11R100, winding R112, contact 5—6R113, lower wire Tr. 1. At the same time slow-acting relay R406 is de-energized, when contact 6—7R404 is opened. The time of release of R406 is prolonged by means of a condenser 452 connected over the following circuit: Minus, winding R406, contact 9—10R406, contact 10—11R410, contact 15—16R413, condenser 452, minus. Operating circuit of relay R403 is also interrupted, but the relay remains operated on account of slow-acting.

When relay R406 is de-energized, the following circuit is closed: Minus, winding R421, contact 8—9R420, contact 17—18R413, contact 12—13R412, contact 16—17R406, contacts 16—18—17R410, plus, whereby relay R421 is operated. The operating circuit of R412 is interrupted, but R412 receives holding current over the following circuit: Minus, winding R412, contact 10—11R412, contact 14—15R404, plus, until relay R404 is operated, and thereafter it still remains operated due to slow-acting until its original operating circuit is closed again, as later on will be shown. Slow-acting relay R404 operates again over contact 12—13R406.

Relay R421 changes the holding current of relay R420 to the following circuit: Minus, coil R420, contact 10—11R420, contact 15—16R421, contact 18—19R406, contacts 16—18—17R410, plus.

Relay R404 again changes the direction of current over trunkline Tr. 1. The operating circuit of relay R112 ceases, but R112 remains in operated condition due to the remanent magnetic field of its core. Relay R101 operates due to current now received over rectifier 123 over the following circuit: Upper wire of trunkline Tr. 1, contact 1—2R113, choke coil 121, rectifier 123, contact 2—3R112, contact 4—5R100, winding R101, contact 5—6R113, lower wire trunkline Tr. 1.

When relay R404 is again operated, the relays R403 and R406 successively operate again so that the operating current of R420 is interrupted. Relay R412 is again operated, when relay R406 closes its contacts 14—15. R421 remains operated over the following circuit: Minus, coil R421, contact 13—14R421, contact 16—17R422, contact 15—16R412, plus. R404 is de-energized after slow action.

When relay R420 is de-energized, R413, which before was short-circuited over contacts 1—2R420 and 2—3R410, receives current over the following circuit: Plus, winding R413, contact 2—3R410, contact 1—2R416, minus. Relay R413 is thus operated.

As before, R403 releases R404. Relay R404, when de-energizing, reestablishes the direction of current in the trunkline Tr. 1. The operating current of R101 ceases in similar manner as before described, but remains in operated position due to its remanent magnetic circuit. Relay R100 now receives current over rectifier 123, whereby it is de-energized. In the relay set No. 1 the original operating circuit of R403 and R406 are interrupted, but R403 remains in operated position as before due to slow action, and R406 is retained operated over another circuit as before described.

When relay R100 is de-energized, current is interrupted over the trunkline, and relay R405 is de-energized. When R405 is de-energized, relay R406 is also de-energized after slow action.

When relay R406 is de-energized, relay R422 is energized over the following circuit: Minus, winding R422, contact 11—12R421, contact 6—7R420, contact 17—18R413, contact 12—13R412, contact 16—17R406, contact 16—18R410, plus. R413 is also de-energized and relay R404 is operated.

Relay R422 switches the holding current of relay R421 which remains energized over 13—14R421, 15—16R422, 18—19R406, 16—18—17R410 to plus.

Relay R404 again changes the direction of current in the trunkline. Relay R102 at the branch exchange and relay R405 at the repeating relay set No. 1 are operated. Relay R102 is operated in similar manner as before described with respect to R101. Relays R403 and R406 are again operated in the same manner as before described, and R421 is released.

Relay R102 interrupts the circuit common to the two selectors at the branch exchange at its contacts 1—2, whereby relay R402 is deenergized at the repeating relay set No. 1. Relay R406 interrupts over its contact 16—17 the operating circuit of R422, but said relay R422 obtains holding current over the following circuit: Minus, coil R422, contact 13—14R422, contact 16—17R423, 15—16R412, plus. Relay R423 operates, and relay R404 is deenergized after slow action.

Relay R404 reestablishes upon its de-energizing the direction of current in the trunkline Tr. 1 The operating current of relay R102 is interrupted, but remains in operated position, due to its remanent magnetic field. Relay R101 now receives current over rectifier 122, which removes the said remanent magnetic field, so that the armature of relay R101 is returned to normal position. Relay R403 remains operated due to slow action, and relay R406 receives holding current over its contact 9—10 as before described.

When relay R101 is de-energized, the circuit of the de-magnetizing current over rectifier 122 is interrupted, but at the same time the trunkline Tr. 1 is connected with calling subscriber S2. Current therefore continues to flow over the trunkline, and relay R405 continues in operated position, relay R406 is held in operated position as before, and R404 is prevented from being operated, until relay R403 releases its armature.

When relay R403 is de-energized from the previous release of R404, the short-circuit of windings R402 ceases, and R402 is operated in series with R405. Relay R406 is kept operated over the following circuit: Minus, winding R406, contact 9—10R406, contact 10—11R410, contact 14—15R413, contact 7—8R403, contact 5—6R411, contact 3—4R402, plus.

Relay R402 interrupts the operating circuit of relay R410, which is de-energized after slow action. When R410 is de-energized, the operating circuit of R406 is opened and R406 is de-energized. Relay R407 is operated and R409 over contacts 8—9R410, now closed, contact 5—6R412, contact 3—4R402, plus. Relay R413 now receives holding current over the following circuit: Plus, winding R413, contact 1—2R410, contact 1—2R413, minus.

Relay R407 closes its contact 1—2 and thus connects trunkline Tr. 1 with junction line No. 2, leading to a supervisory exchange, which is now called over the following circuit: Current source at the supervisory exchange, lower wire of junction line No. 2, contact 7—8R422, contact 7—8R413, contact 1—2R402, contact 1—2R407, winding 455 of R409, contact 4—5R413, contact 5—6R422, upper wire of junction line No. 2, line relay and battery at supervisory exchange. The current passing through winding 455 counteracts the current passing through the other winding 456 of relay R409, so that relay R409 does not operate. Relay R407 also closes the following circuit: Plus, contact 4—5R407, winding R411, contact 9—10R413, rectifier 457, minus. Relay R411 operates.

The following relays are now operated: In the branch exchange: R112 and R102: In the repeating relay set: R402, R407, R412, R422, R411, R413 and R405.

Subscriber S2 is now connected with the supervisory exchange. If this exchange is automatic, the subscriber receives a signal tone from the exchange, and he can now dial the desired number. The impulses are repeated in known manner, when relay R402 breaks its contacts 1—2, whereby the current in the junction line is interrupted and closed in step with the incoming dialed impulses. The disconnection of the established route is described under (*d*).

(*b*) *Incoming call to a subscriber at the branch exchange*

An incoming call to a susbcriber at the branch exchange is received over the junction line, which corresponds to the susbcriber at the supervisory exchange. The supervisory exchange is supposed to be automatic and so arranged that the *a*-wire of the junction line is coupled to the plus-pole of the current source of the supervisory exchange, and that the *b*-wire is connected over a line relay to the minus-pole of said battery. All *a*-wires of the junction lines are in the repeating relay set connected over rectifiers and break contacts in some relays of the repeating relay set to a common calling circuit 458. This calling circuit is coupled to relay R511, as long as same is idle. If it is busy, however, said relay R512 is operated and the call circuit is extended over the corresponding contacts of repeating relay set No. 2 to relay R411, if same is idle. In the following, it is supposed that repeating relay set No. 2 is busy, and that repeating relay set No. 1 is idle. The call circuit is thus connected to R411 of repeating relay set No. 1.

When an incoming call arrives, the *a*-wire of the calling junction line is connected over a relay to minus, while the *b*-wire is connected to plus.

Relay R411 is then operated and afterwards R410. Relay R411 is operated according to the following circuit: Minus at the supervisory exchange, *a*-wire, contact 3—4R422, rectifier 459, contact 3—4R522, contact 4—5R512, contact 1—2R412, contact 3—4R420, winding R411, contact 10—11R413, contact 5—6R403, plus. Relay R411 operates. R410 then operates over the following circuit: Minus, contact 1—2R510, winding R410, contact 7—8R412, contact 7—8R411, contact 4—5R402, plus.

The pulse transmitting means, relays R406 and R404, start operating and transmit impulses of alternating current direction over the trunkline. Relays R100—R110 of the branch exchange operate successively and simultaneously with selector device comprising relays R420—R430 at the repeating relay set. The operations cease, when that relay of R421—R430, which corresponds to the calling junction line, has operated.

Relay R401 then operates and signal current is transmitted over the trunkline to the desired subscriber's line over that relay of R101—R110, which is operated in the branch exchange.

The sequence of operations for a call to subscriber S2 will be the following: Relay R411 operates and closes a circuit for relay R410, which also operates as before described. Relay R410 closes operating circuits for relays R420 and R404, which operate, the latter one somewhat slow acting.

Relay R420 interrupts the operating circuit of circuit R411, which is de-energized. The operating circuit of R410 is then interrupted, but R410 remains for some time energized, due to slow action on account of condenser 451.

Relay R404 changes the direction of current in the winding of R402 and the trunk line Tr. 1, whereby relay R114 of the branch exchange is de-energized, and R100 is operated by current over rectifier 123 in the same manner as in outgoing calls.

Relay R403 is operated, when R404 operates as before described. Relay R403 closes the operating circuit of R406. R406 closes the operating circuit of R412, and interrupts the operating circuit of R404, which is de-energized after slow action.

Relay R412 closes the operating circuit of R410, which again receives operating current.

The sequence of operations continues as previously described according to outgoing calls according to (*a*), until relay R422 is operated. Simultaneously with R422, R404 operates, whereby relay R102 at the branch exchange and relay R406 in the repeating relay set are operated. Relay R406 interrupts the operating circuit of R421, which is de-energized at the same time as R413 operates. R404 is de-energized after slow action, whereby R101 in the branch exchange is de-energized. Current ceases in trunkline Tr. 1 and R405 is de-energized. The following operations will be somewhat different from those for outgoing calls.

Thus R413 closes an operating circuit of R411, whereby this relay is coupled to the *b*-wire of the junction line No. 2. When the call, as supposed, has arrived over this junction line, said *b*-wire has plus potential from the supervisory exchange. R411 therefore operates over the following circuit: Plus at the supervisory exchange, wire *b*, contact 7—8R422, contact 7—8R413, contact 3—4R407, winding R411, contact 9—10R413, rectifier 457, minus.

R411 closes holding circuit of R406. R404 is on that account prevented from operating again, and R403 is de-energized. R411 also interrupts the operating circuit of R410, which is de-energized after slow action. During the slow action time limit, however, the operating circuit of R401 is closed and R401 operates. R401 connects the trunkline over contacts 4—5R401 to the signal generator RG of the supervisory exchange, which generates alternating current of suitable frequency and voltage. At the same time R401 over its contacts 1—2 connects a winding 465 of R402 to the tone signal generator SU of the supervisory station over the following circuit: Plus, tone signal generator SU, contact 4—5R406, contact 1—2R410, winding 465R402, plus. As all windings of relay R402 are located on the same core, the tone signal is transferred over windings of relay R402 to the junction line 2 as a signal to the calling subscriber of the supervisory exchange, that ringing signal is being transmitted.

The signal generator at the supervisory exchange drives an interrupter INT, which intermittently connects terminal ISU to tone signal generator SU over contacts 1—2INT, and which intermittently connects terminal IRG to signal generator RG.

When R410 is de-energized, the operating circuit of R406 is interrupted and R406 is de-energized after slow action. The upper winding of R401 is then disconnected from RG— and connected over contacts 6—7R406 to terminal IRG for intermittent signal transmission. At the same time contact 2 of R401 is connected over contact 3—4R406 to a terminal ISU for intermittent tone signal and disconnects continuous tone signal over contacts 4—5R406 from terminal contacts 5R406. When R410 was de-energized, the operating circuit of R401 was interrupted over contacts 6—7R410, but R401 receives holding current over contacts 12—13R413.

The signal alternating current passes in the branch exchange over windings of relay R113 in series with rectifying elements 115—116 so that R113 operates. Relay R113 interrupts the circuits leading to the relays R109—R114 of the selector and short-circuits the rectifiers 119 and 120 in the main circuit. The signal alternating current can now pass over the main circuit and the subscriber's S2 bell. When the ringing current ceases, relay R113 is de-energized.

When subscriber S2 answers, direct current can freely pass over the trunkline Tr. 1. As the signal alternating current in known manner is superimposed on the battery source of the supervisory exchange (the signal generator is coupled in series with the battery) direct current will pass over the trunkline, the subscriber's telephone and the upper winding of R401.

When R401 is de-energized, the signal alternating, tone-signalling and holding circuits of R401 are interrupted. The trunk line is connected to the current feed relay R402, so that R402 and R405 are operated. R402 closes the operating circuit of R407. R407 when energizing closes its contacts 1—2 and 3—4, so that upper winding of relay R409 is connected between the branches *a* and *b* of the junction line 2, and so that when the subscriber lifts his telephone from its hook, the answer is marked at the supervisory exchange organs by closing of contacts 1—2R402. In the same manner as in outgoing calls, relay R409 receives current over its upper and lower windings in opposite directions, so that their magnetic fields counteract each other. The relay therefore continues nonoperated.

The following relays are now operated: In the branch exchange: R112 and R102: In the supervisory station: R402, R407, R412, R422, R411, R413 and R405.

Talking communication is now established over junction line No. 2 and trunkline Tr. 1 to subscriber S2.

If both trunklines Tr. 1 and Tr. 2 now are busy, the common calling circuit of the repeating relay set is connected over the following circuit to the transformer 458': Minus, one winding of transformer 458', contact 4—5R512, contact 3—4R523, rectifier 460, contact 3—4R423, *a*-wire of another junction line, minus at the supervisory exchange. The other winding of transformer 458' is connected to busy tone generator BTG over the following circuit: Plus, left winding of transformer 458', contact 1—2R411, contact 1—2R511, busy tone generator BTG, plus.

*(c) Interruption of a call in favour of another call, for example a long distance call*

In the supervisory exchange the junction lines from the repeating relay sets terminate as ordinary subscribers' lines connected to the said supervisory exchange. An established local call to or from a subscriber at the branch exchange can thus be interrupted in favour of a long distance call or the like to the same subscriber. The interruption takes place at the supervisory exchange in known manner. In such a case a time-limiting device, later on to be described under heading (*e*) shall, however, be restored to normal position.

A ringing signal shall also be transmitted to the subscriber in case he should have put his receiver on its hook. In order to indicate at the repeating relay set that interruption of an established call is taking place and to direct the necessary switching, relay R409 is used. When the interruption takes place, the current in wire *a* of the junction line is changed through the upper winding 455 of relay R409. The magnetic fields of the two windings 455 and 456 cannot counteract each other, and the relay operates for a moment.

Relay R409 closes the following circuit: Plus, contact 3—4R409, contact 5—6R433, which was closed by cam 461, when the local call was started, and winding R431, minus.

Relay R431 which is a two-step relay operates its contacts *x* only. Relay R409 is de-energized, and the following circuit is closed: Plus, contact 4—5R409, contact 1—2R431, contact 1—2R433, contact 1—2 of self-interruptor R435, minus. The self-interruptor R435 then rapidly steps the cams 461—463 to normal positions, whereby all contacts of R433 and R434 are returned to normal positions, whereafter stepping relay R435 starts again, as if a new call should have time limitation. Detailed description of this time-limiting device will be given in section (*e*).

If the subscriber at the branch exchange puts his telephone on its hook, when interruption is caused by the supervisory exchange, relays R402, R405 and R407 are de-energized, but relay R411 is held in operated position. When relay R409 operates, as above described, the following circuit is closed: Minus, winding R401, contacts 1—2R409, contacts 8—9R404, contacts 2—3R405, which is now de-energized, plus. Relay R401 operates, and signal alternating current is again transmitted over the trunkline as before described in section (*b*).

If the subscriber at the branch exchange puts his telephone on its hook after relay R409 is de-energized after effectuated interruption, relay R409 can be caused to operate again by connecting the signal alternating current circuits of the supervisory exchange to the junction line. On account of the relatively strong signal alternating current, which is rectified in rectifiers associated with the upper winding 455 of R409, the balance between the windings of R409 is changed and R409 operates again and relay R401 is also operated, as has already been described.

*(d) Return of switching devices to normal position after a terminated call*

During a call, one of relays R101—R111 and R112 are operated at the branch exchange. In the repeating relay set No. 1 relays R402, R407, R412, one of relays R421—R430, R411, R413 and R405 are operated. Clearing signal from the subscriber at the branch exchange is marked by interruption of current in the subscriber's line and thus in the trunkline. R402 and also R407 after slow action are de-energized. The holding circuit of R411 over contact 4—5R407 to plus is changed to the *b*-wire of the junction line over contact 1—2R408.

If the other subscriber at the supervisory exchange has not given clearing signal, the said *b*-wire has plus-potential, and R411 is therefore kept operated. When, however, also the second subscriber gives clearing signal, the polarity of the potential over the junction line is changed, and R411 is then de-energized.

When relay R411 is de-energized, the operating circuit of R410 is closed over contacts 8—9R412, contacts 8—9R411 and contacts 4—5R402, plus, so that R410 is operated. Relays R406 and R404 then start successively to operate, causing successive operation and de-magnetization of R420—R430 and R100—R110, as before described. When the last stage has been passed, relay R112 at the branch exchange is de-energized and gives clearing signal to the repeating relay set, which signal causes all relays of said set to de-energize with the exception of R405. At the branch exchange R114 is afterwards operated and relay R111 is de-energized, whereafter the branch exchange and the repeating relay set are returned to normal. The sequence of operations and the circuits are similar to those established, when the communication was set up.

*(e) Supervision and time-limiting device*

At the supervisory station and associated with each repeating relay set there is provided a device for the supervision of the calls and for the limitation of the time of each call. The device consists of a heat relay R436 provided with bimetallic spring 2 between contacts 1 and 3, a two-step relay R431, a relay R432, cam relays R433—434 and a stepping relay R435. The supervision of the calls is used in order to avoid blocking of the branch exchange on account of false calls due to shortcircuited subscribers' lines or the like, and this is particularly the case, if the supervisory exchange is automatic. The supervisory device restores the exchange to normal position after a certain time, after a calling subscriber's line has been connected, if no dial impulses have arrived during said time. If, however, such impulses arrive, the device is set to a substantially longer time, after which the exchange is restored to normal, if all trunklines are busy. The increased time limit is also set, when a call is made from the supervisory station to the branch exchange.

When the branch exchange has been set for an outgoing call, and relay R407 is operated, it closes the operating circuit of thermal relay R436 over the following circuit: Plus, contact 11—12R407, bimetal armature 2 and contacts 10—9R431, contact 7—8R431, thermal winding R436, minus. After a number of seconds thermal relay R436 closes its contacts 1—2, whereby the two-step relay R431 operates over the following circuit: Plus, contacts 11—12R407, contacts 1—2R436, contacts 5—6R431, winding R431, minus. In the first step all contacts marked *x* in the drawing are closed, while the other contacts are operated in the second step.

R431 interrupts the operating circuit of heat relay R436, and its bimetallic spring begins to cool off. When the said spring reaches its normal position and closes its contact 2—3R436, the following circuit is closed, if relay R432 at that time is not operated: Plus, contact 11—12R407, contact 2—3R436, contact 11—12R431, contact 6—7R434, contact 13—14R431, contact 3—4R432, contact 8—9R412, winding R410, contact 1—2R510, minus. Relay R410 operates, and closes the operating circuit of R404, which operates. The branch exchange and the repeating relay set are restored to normal as described in section (*d*). Relay R407 is then de-eenrgized and R431 is also de-energized.

If a subscriber at the branch exchange, after having been connected to the supervisory exchange according to section (*a*), dials a numeral before R436 closes the operating circuit of R410, as above described, relay R432 operates according to the following circuit: Minus, winding R432, contact 8—9R407, contact 4—5R402, Plus, because relay R402 is de-energized a number of times during dialling, and then closes its contact 4—5. R432 receives holding current over the following circuit: Minus, winding R432, contacts 11—12—10 R411, plus.

When R431 is operated in *x*-position, R432 is operated and when the bimetallic spring has cooled, relay R436 closes the following circuit: Minus, contact 4—5R432, contact 13—14R431, contact 6—7R434, contact 11—12R431, contact 2—3R436, 11—12R407, plus. Upper winding of R431 is then short-circuited, and the relay is de-energized.

When R431 is de-energized, the thermal relay R436 is again operated as before. After a few seconds it closes its contacts 1—2 and the first step of relay R431 is again operated. R431 closes operating circuit of R435: Minus, winding R435, contact 1—2R432, contacts 3—4—5—6—7 and 9—10R431, bimetallic spring 2 of R436, contacts 11—12R407, plus. Relay R435 operates and turns cam shaft 464 one step. Contacts of R433 are then actuated. R431 interrupts the heating circuit of R436 and the bimetallic spring begins to cool again. After some seconds the operating circuit of R435 is interrupted and R435 is de-energized. When R436 is restored to normal, its winding is again short-circuited and R436 is de-energized. The operations are repeated and the cams of shaft 464 are turned step-by-step.

After a certain number of steps the contacts of R434 will be operated. Over its contact 1—2 a weak buzzer tone is connected to the winding 465 of relay R402 and transferred to the talking circuit. When the bimetallic spring has cooled, it closes the following circuit: Plus, 11—12R407, contact 2—3R436, contacts 11—12R431, contacts 5—6R434, contacts 1—2R512, contact 8—9R412, winding R410, contact 1—2R510, minus. It is supposed that R512 is operated in the other repeating relay set. R410 operates and afterwards R404. R407 is de-energized and the selecting devices are restored to normal as previously described in section (*d*). During the restoration R411 is de-energized, whereby the operating circuit of R432 is interrupted and R432 is de-energized. When R404 was operated the following circuit was closed: Plus, contacts 11—13R404, contacts 5—6R433, lower winding R431, minus. Relay R431 then operates its second step, and all contacts are operated.

Lower winding of R431 obtains holding current over its contact 15—16 and 5—6R433. R431 also closes the operating circuit of R435 over the following circuit: Plus, contacts 4—5R409, contacts 1—2R431, contact 1—2R433, contacts 1—2R435, winding R435, minus. Relay R435 breaks its own circuit, wherefore it de-energizes, operates again, and so forth. These operations continue until shaft 464 has brought all cams to normal positions, where the contacts of R433 are no longer actuated by its cam. When this operation is reached, the operating circuits of R435 are interrupted and relay R431 is de-energized.

The same time limiting operations can take place for an incoming call. The only difference is that R434 immediately operates, when the selectors have been operated and R411 has closed the operating circuit of R432.

If a call is interrupted in favour of another call, R409 operates according to (c). In this case the lower winding of R431 operates both steps. When R409 thereafter is de-energized the self-interrupting circuit of R435 is closed, and the shaft 464 and cams are returned to normal positions as before described, while R431 is kept operated. When R433 and R434 have returned to normal position, R431 is de-energized, or returns to the first step, only closing contacts *x*, depending upon the position of the bimetallic spring 2R436. The time limiting device then starts anew, as above described.

*(f) Out-of-order conditions*

If either of the trunk lines are out of order due to line trouble, such as interruption, short circuit, the call circuits are automatically switched over to the other circuit. In the branch exchange this occurs, when relay R114 is de-energized, when the continuous current over the trunkline ceases.

Relay R114 obtains holding current from the repeating relay set, when the satellite exchange is idle over the following circuit: Plus, upper winding of relay R405, contact 1—2R404, upper winding relay R402, contact 3—4R401, upper wire of *Tr* 1, contact 1—2R113, coil 121, rectifier 122, contact 11—12R100, contact 7—8R112, contact 7—8R114, both windings R114, contact 5—6R113, lower wire of *Tr* 1, contact 6—7R401, lower winding of R402, contact 3—4R404, lower winding of relay R405, minus. Relay R405 is also actuated in the same circuit.

The common call circuit in the satellite exchange is connected to the trunkline *Tr* 1 over contacts 3—4 and 5—6R114.

If current over *Tr* 1 is interrupted, for example, if one of the line branches is interrupted, relay R114 loses its holding current and the relay is de-energized.

The common call circuit from the subscribers is then switched over to Trunkline *Tr* 2 over contacts 1—2R114 and 4—5R114 to the following circuit: Plus, upper winding R502, upper break contact R501, upper wire *Tr* 2, contact 6—5R214, rectifier 217, contact 4—5R114, rectifier 117, contact 1—2R111 to contact 1—2 relays R101—R110, subscriber's station, contact 1—2 relays R201—210, contact 2—1R211, resistance 129, contact 2—1R114, rectifier 218, contact 2—3R214, lower wire *Tr* 2, lower break contact relay R501, lower winding R505, minus.

When a trunkline is short-circuited, R402 operates, and the repeating relay set is operated in the same manner as when an outgoing call is set up over junction line No. 2, as shown in section (*a*). The supervision device starts operating as described in section (*e*), and after a certain time the repeating relay set is returned to normal. If the fault remains, the selecting device remains connected to another junction line, and the sequence of operations are repeated. In the meantime R112 is operated and keeps the call circuit 458 in the same condition as when the trunkline is busy. When the trouble is cleared, relay R402 is de-energized, and the switching devices are automatically restored as described in section (*d*), although in this case relays R100—110 and R420—430 do not operate synchronously. The restoring operations are, however, terminated as described in section (*d*), when the branch exchange has returned to normal position, whereby the relays of the repeating relay set are de-energized with the exception of R405. When the next call arrives, the operations take place in normal manner.

*(g) Special details*

1. If the selectors of one of the trunklines during their operation must pass a position corresponding to a subscriber connected to the other trunkline, the operation of the selectors should not be interrupted in said position. This might, however, happen, if special arrangements were lacking.

As previously has been described, relay R413 normally operates and is de-energized for each step of the selector relays. The operation of R413 facilitates the interruption of the selecting operation in the actual position of a selector by preparation of the circuits for holding of R496 and operation of R411. The operating circuit of R411 is connected to the junction line which corresponds to a particular selecting step, over contact 7—8 of a select relay R421—R430, contact 6—8 or 7—8R413, contact 3—4R407, winding R411, contact 9—10R413, rectifier 457, minus.

When the selector passes a selecting step, in which the selector of the other trunkline is positioned (we suppose that the upper selector has select relay R522 operated), relay R413 is not energized, because its winding is short-circuited over the following circuit: Plus, contact 6—5R510, contact 1—2R522, contact 1—2R422, contact 2—3R410, winding R413, plus. The operating circuit of R411 is therefore not closed over contacts 6—7 or 7—8R413. The selecting operation is therefore not stopped, when passing over occupied selecting steps.

2. If a subscriber's line has been short-circuited and connected to one of the trunklines, it would be impossible to apply a voltage to the corresponding selector relays, as these relays are connected to the trunkline parallel with the subscriber's line. It would therefore not be possible to drive the selector over said position. In order to prevent the branch exchange to be blocked in such a manner, the rectifiers 119 and 120 have been connected between the trunkline and the selecting contacts of the subscriber's lines. The operating circuits of the selecting relays and their selecting contacts are so arranged, that the only operating impulse, which should be transmitted, while a subscriber's line is connected to the trunkline, has such a direction that it is blocked by rectifiers 119 and 120. This feature is obtained by the fact that each subscriber's line upon operation of the corresponding selecting relay is connected to the trunkline in series with break contacts of the preceding and the succeeding selecting relays.

A subscriber's line is connected to the trunkline *Tr* 1, when its connect relay (R102) is operated and the preceding counting relay (R101) is released. The preceding relay, for example R101, is released over the following circuit: Plus, upper winding relay R405, contact 1—2R404, upper winding relay R402, contact 3—4R401, upper wire trunkline Tr 1, contact 1—2R113, rectifier 122, contact 4—5R112, resistance 126, contact 17—18R102, contact 13—14R101, contact 6—7R100, winding R101, contact 5—6R113, lower wire Tr 1, contact 6—7R401, lower winding R402, contact 4—5R404, lower winding R406, minus. When relay R101 is released, subscriber's line S2 is connected to the repeating relay set over the following circuit: Plus, upper winding relay R405, contact 1—2R404, upper winding R402, contact 3—4R401, upper wire Tr 1, rectifier 120, contact 4—5R102, subscriber's station S2, contact 6—7R101, contact 10—9R102, break contact R103, rectifier 119, lower wire Tr 1, contact 6—7R401, lower winding R402, contact 3—4R404, lower winding R405, minus.

In order to step the selector, relay R103 must be operated by changing the direction of current over Tr 1. If subscriber's line S2 is short-circuited, and if rectifiers 119 and 120 were omitted, said relay R103 could not be operated, because the wires of Tr 1 would be short-circuited over the following circuit: Upper wire Tr 1, contact 4—5R102, short circuit between the branches of the subscriber's line, contact 6—7R101, contact 10—9R102, break contact R103, lower wire Tr 1.

If, however, rectifiers 119 and 120 are connected as shown, relay R103 is not short-circuited for minus polarity over the upper wire and for plus polarity over the lower wire of Tr 1, because the rectifiers do not allow current of said polarity to pass over the subscriber's line.

Relay R103 can, however, be operated over the following circuit: Plus, lower winding R405, contact 5—4R404, lower winding R402, contact 6—7R401, lower wire Tr 1, contact 5—6R11w, winding R103, contact 13—14R102, contact 11—12R101, contact 4—5R100, contact 2—3R112, rectifier 123, choke coil 121, contact 1—2R113, upper wire Tr 1, contact 4—3R401, upper winding R402, contact 2—3R404, lower winding R405, minus.

The selecting relays are besides so arranged that they operate for a direction of current contrary to that which is prevailing during conversation.

We suppose that subscriber's line No. 2 becomes short-circuited. Said line will then call the repeating relay set, and the operations of the selector relays start as described in (a). When relay R102 is operated, the subscriber's line is not connected immediately, because the common circuit 130 is interrupted by R101, which is still operated. When the direction of current is reversed R101 is de-energized, whereby said circuit 130 is closed, so that subscriber's S2 line can be connected to the trunkline Tr 1. The selecting relays remain in the said positions, but the supervising devices of the repeating relay set No. 1 start operating as described in (e), and the impulse transmission is again started after a certain time. When the direction of current in the trunkline is reversed, the current over the subscriber's line is blocked by rectifiers 119 and 120, so that relay R103 can operate. This relay interrupts circuit 130 and the restoration to normal can continue. The short-circuited line will repeat the call, when the branch exchange has been restored to normal, whereafter the operations are repeated. Each time the selecting relays in said manner are operated, the selecting operations can be interrupted at any of the other subscribers' lines, if any of these are called. Thus the branch exchange cannot be made inoperative on account of short-circuited subscribers' lines.

Conditions will be similar when a subscriber's line becomes grounded.

3. The joint connection of all the subscribers' lines in normal position, and the successive connection of same by means of pulses of alternating direction cause certain variations of potential in the subscribers' lines. These variations might cause ringing of the subscribers' bells. In order to avoid this inconvenience rectifiers 117, 118, 127 and 128 are connected as shown in Fig. 3.

The rectifiers 127, 128 are individual for the respective subscribers' lines. They prevent the discharge of the condensers of the other subscribers' lines in series with the respective bells, when a call from one of the subscribers is made. Such a discharge would otherwise take place, as all the telephones are connected in their normal positions. The individual rectifiers 127, 128, etc. are relatively small, so that they will not with a certainty prevent those discharges of the telephone condensers, which might be caused by the first reversal of the potential over the trunkline after a call has been made. Additional rectifiers 117 and 118 are therefore provided in both wires of the common call circuit.

4. When the selecting relays after a call are returned to normal according to section (d) and R114 is being operated, the common call circuit 130 is connected to the corresponding trunk line in parallel with winding of R114. If now a subscriber's line is short-circuited, relay R114 would not be able to operate completely, but would be stopped, when it closes its contacts 3—4 leading to the common circuit 131, unless special arrangements were made. The relay would then be de-energized and be operated again and so forth.

This inconvenience is prevented by means of a resistance 129 connected in circuit 130, and which prevents relay R114 from being entirely short-circuited by the subscriber's line.

5. When a call is arriving, alternating current is transmitted. This alternating current should not be allowed to disturb the selecting relays. In order to prevent this possibility, relay R113 operates and disconnects the selecting relays from the trunklines. It might, however, happen, that a short but relatively heavy potential reaches the selecting relays, before R113 has had time to operate.

In order to prevent this, a choke coil 121 is connected in series with the operating circuits of the selecting relays, and a voltage dependent resistor, for example carbide of silicium, 124, is connected in parallel with said circuits.

When the alternating ringing circuit for calling the subscriber is transmitted over the trunkline, and before relay R113 operates, the counting relays are connected in parallel between the wires of the trunkline over the following circuit: RG plus, contact 4—5R401, upper wire Tr 1, contact 1—2R11w, rectifier 123, contact 2—3R112, and in parallel over contacts 3—4R100, 1—11R101 and make contact 13—14 of the operated relay R102, winding R103, and over the resistor 124, which is connected in parallel with the counting relays; further over contacts 5—6R113, lower wire of trunkline Tr 1, contact 7—8R401, 7—8R406, RG minus.

Due to the fact that the resistance of the resistor 124 is substantially lowered, when subjected to high voltage of the alternating ringing current, only a small part of the said current will pass through the coil of counting relay R103. R103 will not be operated by said current. The counting relays will however be operated by a lower voltage, when the major part of the current passes through the winding, in which case the resistance of the resistor 124 is high. For normal operating pulses the potentials in the trunk line will substantially appear over resistance 124 and the operating circuits. When a short and heavy peak potential, however, appears, a substantial part of the potential will be absorbed in the choke coil 121 and only a minor part of the potential will reach the operating circuits.

6. When a call is established in the branch exchange, one of the relays R101—110 and R112 are operated. If one of these should be de-energized due to undue mechanical or electrical action, the branch exchange can nevertheless be restored to normal by means of normal current reversal pulses. If therefore one of R101—R110 is de-energized, a circuit is closed over the series-connected break contacts of all the selecting relays and closes a de-magnetizing current circuit for R112, so that it is de-magnetized, whereafter the branch exchange is restored to normal. When the repeating relay set shall restore the select organs, the selecting relays are stepped forward beginning with R100 according to section (*a*). The stepping continues until the normal position is reached, whereby the repeating relay set is also restored according to (*d*).

If relay R112 is de-energized, when a call is established, said call is not interrupted. When the call in a normal manner shall be disconnected, the stepping begins with relay R100, whereafter relay R112 can operate again. Due to the fact that the operating circuits of a selecting relay passes over break contacts of all preceding selecting relays, only one relay will be actuated at the same time, and the stepping therefore continues without difficulty, until the normal position is reached. Branch exchange and repeating relay set are thus returned to normal.

7. In the repeating relay set there is a condenser 451 connected in parallel with winding of relay R410, whereby said condenser together with resistance 450 in the operating circuit of relay R410 causes a certain slow action. In this manner the selecting operation is prevented from starting on account of so-called rapid instantaneous contacts between the wires of the trunk line, for example on account of swinging wires due to heavy wind.

8. In one of the operating circuits of relay R411 there is connected a rectifier 457, which prevents an unfavourable actuation of the relay by alternating signalling current, when said relay is held over the *b*-wire of the junction line, and which alternating signal current might come over this wire from the supervisory exchange.

We claim:

1. In a switching system, a switching device, means at a remote place including a direct current source and a pulse transmitting device for operating said switching device, a two-wire trunkline between the switching device and said operating means, a plurality of local lines connected to said switching device, said switching device comprising a plurality of counting relays provided with switching contacts for the connection of said trunkline with any of said local lines, said pulse transmitting device comprising means to transmit direct current pulses from said direct current source over both trunkline wires connected in series, means whereby said counting relays are automatically and successively operative and releasable in accordance with said direct current pulses, a circuit being provided between each counting relay and said trunkline for the conduction of a direct current pulse to said relay for operating same and another circuit between said relay and said trunkline for conducting another direct current pulse to said counting relay for releasing same, said relay comprising means to keep it in operated position between the said operate and release pulses.

2. In a switching system, a switching device, means at a remote place including a direct current source and a pulse transmitting device for operating said switching device, a two-wire trunkline between the switching device and said operating means, a plurality of local lines connected to said switching device, said switching device comprising a plurality of counting relays provided with switching contacts for the connection of said trunkline with any of said local lines, said pulse transmitting device comprising means to transmit direct current pulses from said direct current source over both trunkline wires connected in series, means whereby said counting relays are automatically and successively connectable to said trunkline and selectively operable and releasable in accordance with said direct current pulses, each counting relay having a core and a coil on said core, an operating circuit between the coil of each counting relay and said trunkline for the conduction of a direct current pulse through said coil in one direction for operation of said counting relay, and another circuit between the said coil and said trunkline for conducting another direct current pulse through the said coil in the other direction for releasing the said relay, the core of said counting relay consisting of retentive magnetic material to keep said relay in operated position between the said operate and release pulses.

3. In a switching system, a switching device, means at a remote place including a current source and a pulse transmitting device for operating said switching device, a two-wire trunkline between the switching device and said operating means, a plurality of local lines connected to said switching device, said switching device comprising a plurality of counting relays provided with switching contacts for the connection of said trunkline with any of said local lines, said pulse transmitting device comprising means to transmit direct current pulses from said direct current source over both trunkline wires connected in series, means whereby said counting relays are automatically and successively connectable to said trunkline and selectively operative and releasable in accordance with said direct current pulses, each counting relay being provided with a make contact, a core and a coil on said core, an operating circuit between the coil of each counting relay and said trunkline for the conduction of a current pulse through said coil in one direction for operation of said counting relay and a releasing circuit between said coil and said trunkline for conducting another direct current pulse through said coil in the other direction for releasing said relay, said releasing circuit passing over said make contact, the core of said counting relay consisting of retentive magnetic material to keep said relay in operated position between said operate and release pulses.

4. The switching system claimed in claim 3, in which a rectifier is connected in series with the trunkline and with the operating circuit of said counting relays, and another rectifier is connected in series with said trunkline and with the releasing circuit of said counting relays, and whereby said pulse transmitting device at the remote place comprises means to transmit direct current pulses of one current direction or of the other over said trunkline.

5. In a switching system, a switching device, means at a remote place including a current source and a pulse transmitting device for operating said switching device, a two-wire trunkline between the switching device and said operating means, a plurality of local lines connected to said switching device, said switching device comprising a plurality of counting relays provided with switching contacts for the connection of said trunkline with any of said local lines, a two-wire main circuit in the switching device interconnected between said trunkline and said local lines and common to all the said local lines, said main circuit passing over said switching contacts of said counting relays, means in said main circuit to prevent obstruction of the correct function of said counting relays due to out-of-order conditions in any of said local lines, when coupled to the trunkline, said pulse transmitting device comprising means to transmit direct current pulses from said direct current source over both trunkline wires connected in series, means whereby said counting relays are automatically and successively connectable to said trunkline and selectively operable and releasable in accordance with said direct current pulses, each counting relay having a core and a coil on said core, an operating circuit between the coil of each counting relay and said trunkline for the conduction of one direct current pulse through said coil in one direction for the operation of said relay, and a releasing circuit between said coil and said trunkline for conducting another direct current pulse through said coil in the other direction for releasing said relay, the core of said counting relay consisting of retentive magnetic material to keep said relay in operated position between the said operate and release pulses.

6. The switching system claimed in claim 3, in which a rectifier is connected in series with the operating circuit of said counting relays, and another rectifier is connected in series with the releasing circuit of said counting relays, said pulse transmitting device at the remote place comprising means to transmit direct current pulses of one direction or of the other over said trunkline, a choke coil being interconnected between said trunkline and said operating and releasing circuits, and a voltage dependent resistor in parallel with said counting relays, said resistor being of such a type that its resistance value is high when the resistor is subjected to normal operating potentials, and its resistance value is substantially reduced, when the resistor is subjected to potentials substantially higher than said normal operating potentials.

7. The switching system claimed in claim 3, in which the switching device comprises a switching relay connected to said two-wire trunkline, a two-wire main circuit interconnected between said trunkline and said local lines and common to all the said local lines, said main circuit passing over the said switching contacts of said counting relays, said switching relay being provided with make and break contacts, over which said main circuit and said operating and releasing circuits are alternately connectable to the trunkline, and means interconnected between said switching relay and said trunkline whereby said switching relay is operable by alternating current, and in which means are provided at said remote place for transmitting alternating signaling current over said trunkline for operating said switching relay and for transmitting signals over any of said local lines upon the operation of said switching relay.

8. The switching system claimed in claim 1, in which a two-wire main circuit is interconnected between said trunkline and said local lines and common to all the said local lines, each local line being connectable to the main circuit over break contacts in counting relays immediately preceding and succeeding the counting relay, which corresponds to said local line.

9. The switching system claimed in claim 1, in which a two-wire calling circuit common to said local lines and interconnected between said trunkline and said local lines is provided, a subscriber's station connected to each local line, an individual calling circuit between each local line and said common calling circuit passing over break contacts in a counting relay corresponding to said local line, a rectifier in each wire of said common calling circuit and an additional rectifier in series with each individual calling circuit for the prevention of false signals in the subscribers' stations connected to said local lines, when the counting relays are stepped by pulses over the trunkline.

10. The switching system claimed in claim 1, in which a two-wire calling circuit common to said local lines and interconnected between said trunkline and said local lines is provided, a resistance being connected in series with one of the wires of said common call circuit for preventing blocking of the counting relays, should one of the local lines be short-circuited.

11. The switching system claimed in claim 1, in which a two-wire calling circuit common to said local lines and interconnected between said trunkline and said local lines is provided, at said remote place a line relay being connected to the trunkline for receiving a call from any of said local lines, means coupled to said line relay for starting the operation of said pulse transmitting device upon the receipt of a call, means in the switching device coupled to said trunkline and adapted to disconnect the said common calling circuit from the trunkline upon the start of said pulse transmitting device, and means at the said remote place for disconnecting said pulse transmitting device from the trunkline, when the calling local line has been connected by its corresponding counting relay to the trunkline.

12. In a telephone system, a branch office, a plurality of local subscribers' lines connected to said branch office, a supervisory office a direct current source and a repeating relay set including a pulse transmitting device at said supervisory office, a two-wire trunkline interconnecting said branch office with said repeating relay set, a two-wire junctor for each one of said local subscribers' lines between said repeating relay set and said supervisory office, said junctors terminating in said supervisory office as ordinary subscribers' lines, said branch office comprising a plurality of counting relays provided with switching contacts for the connection of said trunkline with any one of said local subscribers' lines, means whereby said counting relays are automatically and successively connectable to said trunkline and selectively operative and releasable in accordance with pulses transmitted over both trunkline wires connected in series with said current source, means whereby each counting relay is operable by one current pulse and releasable by another current pulse, said relay comprising means to keep it in operated position between the said operate and release pulses, said repeating relay set comprising a selector connected to said pulse transmitting device, and means whereby said selector is selectively operable in accordance with the said pulses for connecting said trunkline to anyone of said junctors synchronously with the selective operation of said counting relays at said branch office.

13. In a telephone system, a branch office, a plurality of local subscribers' lines connected to said branch office, a supervisory office, a direct current source and a repeating relay set including a pulse transmitting device at said supervisory office, a two-wire trunkline interconnecting said branch office with said repeating relay set, a two-wire junctor for each one of said local subscribers' lines between said repeating relay set and the supervisory office, said junctors terminating in said supervisory office as ordinary subscriber's line, said branch office comprising a first selector for the connection of said trunkline with any of said subscribers' lines, means whereby said selector is selectively operable in accordance with pulses transmitted over said trunkline from said pulse transmitting device, said repeating relay set comprising a second selector connected to said pulse transmitting device, and means whereby said second selector is selectively operable in accordance with the said pulses for connecting said trunkline to anyone of said junctors in step with the selective operation of said first selector at said branch office for the successive connection to said trunkline of local subscribers' lines at the branch office and of corresponding junctors at the supervisory office.

14. A telephone system as claimed in claim 12, in which said repeating relay set comprises a relay for starting said pulse transmitting device, a call circuit common to said junction lines, said junctors coupled to said starting relay over said common call circuit, said starting relay being provided with means to start said pulse transmitting device upon the receipt of a call over any of said junctors.

15. A telephone system as claimed in claim 12, in which said repeating relay set comprises a relay for starting said pulse transmission device, a call circuit common to said junctors, a rectifier normally interconnected between each junctor and the common call circuit for preventing disturbing currents from one junctor to another, said common call circuit being normally connected to said starting relay which relay is provided with means to start said pulse transmitting device upon the receipt of a call over any of said junctors.

16. A telephone system as claimed in claim 12, in which said repeating relay set comprises a circuit common to said junctors and normally connected to same, a busy tone transmitting device, and means for connecting said busy tone transmitting device to said common circuit, when said selector is busy.

IVAN VITALIS GRUNDIN.
ERIK GUNNAR VALFRID ERLANDSSON.

REFERENCES CITED

The following references are of record in the file of this patent:

UNITED STATES PATENTS

| Number | Name | Date |
|---|---|---|
| Re. 16,293 | Richardson | Mar. 16, 1926 |
| 961,342 | Eastwood | June 14, 1910 |
| 1,029,974 | Burnham | June 18, 1912 |
| 1,200,811 | Clement | Oct. 10, 1916 |
| 1,374,201 | Hall | Apr. 12, 1921 |
| 1,567,122 | Dunham | Dec. 29, 1925 |
| 1,886,216 | Nilsson | Nov. 1, 1932 |
| 1,992,389 | Moser | Feb. 26, 1935 |
| 2,009,405 | Leich | July 30, 1935 |
| 2,019,320 | Runner | Oct. 29, 1935 |
| 2,054,702 | Kiner | Sept. 15, 1936 |
| 2,136,630 | Massoneau | Nov. 15, 1938 |
| 2,260,810 | Jones | Oct. 28, 1941 |
| 2,297,092 | Wicks | Sept. 29, 1942 |
| 2,340,554 | Peterson | Feb. 1, 1944 |